United States Patent
Kennedy et al.

[19]

[11] Patent Number: 5,937,155
[45] Date of Patent: *Aug. 10, 1999

[54] INTERACTIVE REPORT GENERATION SYSTEM AND METHOD OF OPERATION

[75] Inventors: Brian M. Kennedy, Coppell; Lamott G. Oren, Dallas; Walter J. Buehring, Jr., Richardson, all of Tex.

[73] Assignee: i2 Technologies, Inc., Irving, Tex.

[*] Notice: This patent is subject to a terminal disclaimer.

[21] Appl. No.: 09/059,223

[22] Filed: Apr. 13, 1998

Related U.S. Application Data

[63] Continuation of application No. 08/491,121, Jun. 16, 1995.

[51] Int. Cl.$^6$ .................................................. G06F 17/30
[52] U.S. Cl. .............................. 395/183.14; 395/183.16; 707/500; 707/503; 707/504; 707/509; 707/505
[58] Field of Search ........................ 395/183.14, 183.15, 395/183.16, 183.21, 183.22, 184.01, 185, 500; 707/503, 504, 509, 903, 905, 908; 345/326, 327, 329

[56] References Cited

U.S. PATENT DOCUMENTS

| | | | |
|---|---|---|---|
| 4,209,845 | 6/1980 | Berger et al. | 364/900 |
| 4,611,280 | 9/1986 | Linderman | 364/300 |
| 4,611,310 | 9/1986 | Durbin | 365/230 |
| 4,742,467 | 5/1988 | Messerich et al. | 395/703 |
| 4,827,423 | 5/1989 | Beasley et al. | 364/468 |
| 5,089,970 | 2/1992 | Lee et al. | 364/468 |
| 5,148,370 | 9/1992 | Litt et al. | 364/468 |
| 5,175,857 | 12/1992 | Inoue | 395/800 |
| 5,189,608 | 2/1993 | Lyons et al. | 705/30 |
| 5,216,612 | 6/1993 | Cornett et al. | 364/468 |
| 5,218,700 | 6/1993 | Beechick | 395/700 |
| 5,233,533 | 8/1993 | Edstrom et al. | 364/468 |
| 5,280,425 | 1/1994 | Hogge | 364/402 |
| 5,293,615 | 3/1994 | Amada | 707/4 |
| 5,303,144 | 4/1994 | Kawashima et al. | 364/401 |
| 5,361,393 | 11/1994 | Rossillo | 395/650 |
| 5,369,570 | 11/1994 | Parad | 364/401 |
| 5,371,675 | 12/1994 | Greif et al. | 364/419.1 |
| 5,426,781 | 6/1995 | Kaplan | 395/600 |
| 5,600,584 | 2/1997 | Schlafly | 364/745 |
| 5,604,854 | 2/1997 | Glassey | 707/503 |

FOREIGN PATENT DOCUMENTS

| | | |
|---|---|---|
| 0231552 | 12/1987 | European Pat. Off. . |
| 0466089 | 1/1992 | European Pat. Off. . |
| 0466090 | 1/1992 | European Pat. Off. . |
| 0067303 | 12/1982 | Germany ................. G06F 15/20 |

*Primary Examiner*—Dieu-Minh T. Le
*Attorney, Agent, or Firm*—Baker & Botts, L.L.P.

[57] ABSTRACT

A computer software system (10) is provided. The computer software system (10) includes a compiler (12) operable to receive a worksheet definition (20) and to access a plurality of model interface functions (16). The worksheet definition (20) is named and parameterized and comprises a plurality of cell definitions (24) each defining a model-independent expression (26). The compiler (12) is further operable to generate a worksheet template (32) comprising a plurality of cell templates (36) each defining a model-dependent expression (38). An evaluator (40) is operable to receive the worksheet template (32) and a parameter expression. The evaluator (40) is further operable to access the plurality of model interface functions (16) and a user model (60). The evaluator (40) is operable to evaluate the model-dependent expressions (38) in the worksheet template (32) and is operable to generate a worksheet instance (48) containing a plurality of cell instances (52) defining model-specific values (54).

6 Claims, 5 Drawing Sheets

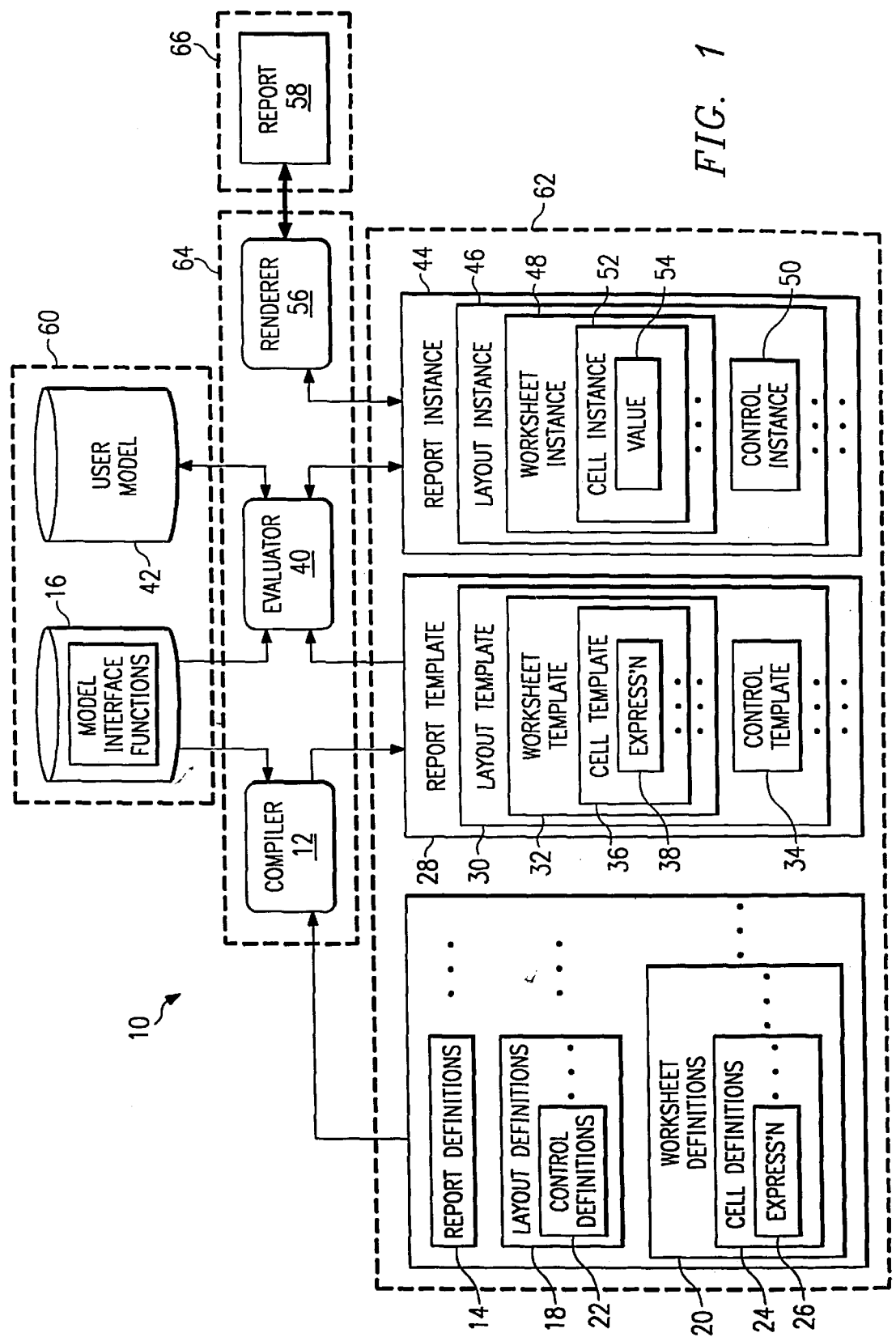

| Expression Evaluates To: | Number of Cells that Result: |
|---|---|
| List<V> | One cell for each V in list |
| List<T> | One cell for each T in list |
| S computed from T in List<T> | One cell for each T in list |
| R computed from T in List<T> and V in List<V> | One cell for each T-V combination |
| List<Q> computed from T in List<T> | One cell for each Q computed from each T |
| List<P> computed from T in List<T> and V in List<V> | One cell for each P computed from each T-V combination |
| List<N> computed from N of its own List, recursively | One cell for each N computed by the leaf calls |

*FIG. 2*

| A1 | B1 |
|---|---|
| 2 | 5 |
| 3 | 6 |
| 5 | 8 |

*FIG. 3A*

|  | 2 | 3 | 5 |
|---|---|---|---|
| a | a2 | a3 | a5 |
| e | e2 | e3 | e5 |
| i | i2 | i3 | i5 |
| o | o2 | o3 | o5 |
| u | u2 | u3 | u5 |

*FIG. 3B*

| A1 | C1 |
|---|---|
| 2 | 2 |
|   | 4 |
| 3 | 3 |
|   | 6 |
|   | 9 |
| 5 | 5 |
|   | 10 |
|   | 15 |
|   | 20 |
|   | 25 |

*FIG. 3C*

| A1 | C1 | C2 | | | | |
|---|---|---|---|---|---|---|
| 2 | 2 | a2 | e2 | i2 | o2 | u2 |
|   | 4 | a4 | e4 | i4 | o4 | u4 |
| 3 | 3 | a3 | e3 | i3 | o3 | u3 |
|   | 6 | a6 | e6 | i6 | o6 | u6 |
|   | 9 | a9 | e9 | i9 | o9 | u9 |
| 5 | 5 | a5 | e5 | i5 | o5 | u5 |
|   | 10 | a10 | e10 | i10 | o10 | u10 |
|   | 15 | a15 | e15 | i15 | o15 | u15 |
|   | 20 | a20 | e20 | i20 | o20 | u20 |
|   | 25 | a25 | e25 | i25 | o25 | u25 |

*FIG. 3D*

| | | A2 | a | e | i | o | u |
|---|---|---|---|---|---|---|---|
| A1 | B1 | C1 | B2 | | | | |
| 2 | 5 | 2 | a2 | e2 | i2 | o2 | u2 |
| | | 4 | | | | | |
| 3 | 6 | 3 | a3 | e3 | i3 | o3 | u3 |
| | | 6 | | | | | |
| | | 9 | | | | | |
| 5 | 8 | 5 | a5 | e5 | i5 | o5 | u5 |
| | | 10 | | | | | |
| | | 15 | | | | | |
| | | 20 | | | | | |
| | | 25 | | | | | |

| A1 | B1 | C1 |
|---|---|---|
| 2 | 5 | 2 |
| | | 4 |
| 3 | 6 | 3 |
| | | 6 |
| | | 9 |
| 5 | 8 | 5 |
| | | 10 |
| | | 15 |
| | | 20 |
| | | 25 |

| | | A2 | a | e | i | o | u |
|---|---|---|---|---|---|---|---|
| A1 | B1 | C1 | C2 | | | | |
| 2 | 5 | 2 | a2 | e2 | i2 | o2 | u2 |
| | | 4 | a4 | e4 | i4 | o4 | u4 |
| 3 | 6 | 3 | a3 | e3 | i3 | o3 | u3 |
| | | 6 | a6 | e6 | i6 | o6 | u6 |
| | | 9 | a9 | e9 | i9 | o9 | u9 |
| 5 | 8 | 5 | a5 | e5 | i5 | o5 | u5 |
| | | 10 | a10 | e10 | i10 | o10 | u10 |
| | | 15 | a15 | e15 | i15 | o15 | u15 |
| | | 20 | a20 | e20 | i20 | o20 | u20 |
| | | 25 | a25 | e25 | i25 | o25 | u25 |

| A2 | a | | e | | i | | o | | u | |
|---|---|---|---|---|---|---|---|---|---|---|
| C1 | B2 | C2 | B2 | C2 | B2 | C2 | B2 | C2 | B2 | C2 |
| 2 | a2 | a2 | e2 | e2 | i2 | i2 | o2 | o2 | u2 | u2 |
| 4 | a2 | a4 | e2 | e4 | i2 | i4 | o2 | o4 | u2 | u4 |
| 3 | a3 | a3 | e3 | e3 | i3 | i3 | o3 | o3 | u3 | u3 |
| 6 | a3 | a6 | e3 | e6 | i3 | i6 | o3 | o6 | u3 | u6 |
| 9 | a3 | a9 | e3 | e9 | i3 | i9 | o3 | o9 | u3 | u9 |
| 5 | a5 | a5 | e5 | e5 | i5 | i5 | o5 | o5 | u5 | u5 |
| 10 | a5 | a10 | e5 | e10 | i5 | i10 | o5 | o10 | u5 | u10 |
| 15 | a5 | a15 | e5 | e15 | i5 | i15 | o5 | o15 | u5 | u15 |
| 20 | a5 | a20 | e5 | e20 | i5 | i20 | o5 | o20 | u5 | u20 |
| 25 | a5 | a25 | e5 | e25 | i5 | i25 | o5 | o25 | u5 | u25 |

FIG. 4E

| | B2 | | | | | C2 | | | | |
|---|---|---|---|---|---|---|---|---|---|---|
| A2 | a | e | i | o | u | a | e | i | o | u |
| C1 | | | | | | | | | | |
| 2 | a2 | e2 | i2 | o2 | u2 | a2 | e2 | i2 | o2 | u2 |
| 4 | a2 | e2 | i2 | o2 | u2 | a4 | e4 | i4 | o4 | u4 |
| 3 | a3 | e3 | i3 | o3 | u3 | a3 | e3 | i3 | o3 | u3 |
| 6 | a3 | e3 | i3 | o3 | u3 | a6 | e6 | i6 | o6 | u6 |
| 9 | a3 | e3 | i3 | o3 | u3 | a9 | e9 | i9 | o9 | u9 |
| 5 | a5 | e5 | i5 | o5 | u5 | a5 | e5 | i5 | o5 | u5 |
| 10 | a5 | e5 | i5 | o5 | u5 | a10 | e10 | i10 | o10 | u10 |
| 15 | a5 | e5 | i5 | o5 | u5 | a15 | e15 | i15 | o15 | u15 |
| 20 | a5 | e5 | i5 | o5 | u5 | a20 | e20 | i20 | o20 | u20 |
| 25 | a5 | e5 | i5 | o5 | u5 | a25 | e25 | i25 | o25 | u25 |

FIG. 4F

| A1 | | |
|---|---|---|
| 2 | B1 | 5 |
| | C1 | 2 |
| | | 4 |
| 3 | B1 | 6 |
| | C1 | 3 |
| | | 6 |
| | | 9 |
| 5 | B1 | 8 |
| | C1 | 5 |
| | | 10 |
| | | 15 |
| | | 20 |
| | | 25 |

*FIG. 4G*

INTERACTIVE REPORT GENERATION SYSTEM AND METHOD OF OPERATION

RELATED APPLICATIONS

This application is a continuation of application Ser. No. 08/491,121 filed Jun. 16, 1995 by Brian M. Kennedy and entitled "Model-Independent and Interactive Report Generation System and Method of Operation", now U.S. Pat. No. 5,832,532.

CROSS REFERENCE TO RELATED APPLICATIONS

This application is related to the following applications which are incorporated herein by reference: U.S. application Ser. No. 08/461,167, filed Jun. 16, 1995, and entitled SYSTEM AND METHOD FOR MANAGING ATP (Attorney Docket No. 020431.0135). U.S. application Ser. No. 08/461,153, filed Jun. 16, 1995, now U.S. Pat. No. 5,564,457 and entitled EXTENSIBLE MODEL NETWORK REPRESENTATION SYSTEM FOR PROCESS PLANNING (Attorney Docket No. 020431.0136). U.S. application Ser. No. 08/461,108, now U.S. Pat. No. 5,559,994 filed Jun. 16, 1995, and entitled STRATEGY DRIVEN PLANNING SYSTEM AND METHOD OF OPERATION (Attorney Docket No. 020431.0138).

TECHNICAL FIELD OF THE INVENTION

This invention relates in general to the field of electronic systems, and more particularly to an interactive report generation system and a method of operation.

BACKGROUND OF THE INVENTION

Conventional planning software applications are used in a wide variety of industries to accomplish various planning purposes. These planning software applications generally utilize a model of the user's environment for which planning is desired. In the manufacturing context, personnel could use planning software to develop solutions to problems and to react and compete intelligently in a given market. Planning software is needed that can be programmed by users to answer the questions that need to be answered in a format useful to the user.

The productivity impact of manufacturing planning software may be limited by the capabilities of the software, itself. Conventional planning software can be incapable of generating needed reports, performing needed analysis, allowing the needed modifications to a model, or modeling the problem needed to be solved. Consequently, users have limited options because many helpful planning tasks cannot reasonably be done manually and planning software is unable to do them automatically.

One fundamental need of manufacturing personnel, for example, is to generate custom reports that display desired information in formats, terms, and units that are used in daily manufacturing operations. Users of planning software should not be required to manually search a large quantity of data to find desired information and complete a desired analysis. Users also should not be required to convert data mentally from one set of units into units used on the factory floor. All searching, sorting, filtering, converting and translation is work that it is advantageous for planning software applications to handle.

The programming mechanism that is most widely used by non-programming professionals is the conventional spreadsheet, such as LOTUS 1-2-3 and MICROSOFT EXCEL. Often planners, purchasers, sales professionals and others, faced with inadequate planning software applications, develop sophisticated analyses and reports using conventional spreadsheet tools.

Contrary to conventional planning software applications, it is advantageous that a planning software application be directly programmable by the personnel that need planning tools. It is problematic for a user to be required to turn to a local system maintainer or programmer or the software vendor to initiate a new analysis or to make minor adjustments. It is also problematic if a user is unable to experiment with different options and possibilities in order to develop an analysis of and interface with the modeled environment whether manufacturing, distribution, supply or other planning environment. It also is advantageous that a user be enabled to accomplish planning analysis through direct interaction with a reporting system.

SUMMARY OF THE INVENTION

A need has arisen for a report generation system that provides programmability, model independence and interactivity.

In accordance with the present invention, an model-independent and interactive report generation system and a method of operation are provided that substantially eliminate or reduce disadvantages and problems associated with conventional planning and spreadsheet software applications.

According to one embodiment of the present invention, a computer software system is provided. The computer software system includes a compiler operable to receive a worksheet definition and to access a plurality of model interface functions. The worksheet definition is named and parameterized and comprises a plurality of cell definitions each defining a model-independent expression. The compiler is further operable to generate a worksheet template comprising a plurality of cell templates each defining a model-dependent expression. An evaluator is operable to receive the worksheet template. The evaluator is further operable to access the plurality of model interface functions and a user model. The evaluator is operable to evaluate the model-dependent expressions in the worksheet template and is operable to generate a worksheet instance containing a plurality of cell instances defining model-specific values.

According another embodiment of the present invention, an interactive report generation system is provided that includes a compiler, an evaluator, a renderer, and a plurality of model interface functions. The compiler is operable to receive report, layout, and worksheet definitions, to access a plurality of model interface functions, and to generate a report template. The evaluator is operable to receive the report template, to access a plurality of model interface functions, to access a user model, and to generate a report instance. A renderer is operable to receive the report instance and to display and allow interaction with that report instance.

One technical advantage of the present invention is allowing interactive access to a model of a user's environment through report functions where the functions are parameterized and are independent of the model. The cells provided in a worksheet of a report have "set" expressions in addition to "get" expressions such that editing the cell can result in changes to data in the user's model as opposed to changes simply in the cell.

Another technical advantage of the present invention is that the values returned by the worksheet and model access functions have a well-defined type. The type allows type-sensitive interaction and help. Further, the type allows overloaded functions which are functions with the same name that take different types of arguments and can have different behavior for each.

An additional technical advantage of the present invention is the provision of different classes of worksheets within reports such as normal (one cell formula results in one value) and replicating (one cell formula is replicated into many cell values) worksheets.

A further technical advantage of the present invention is the provision of different classes of layouts associated with each class of worksheets in reports such as tabular, bar chart, Gantt chart, and menu layouts. Further, the present invention allows different tabular layouts, and in particular, provides the flexible axis-cross layout for replicating worksheets in reports.

A further technical advantage is the ability of layouts to utilize different controls for display of and interaction with the cells in the worksheet of a report. Examples of the different controls provided include different classes of controls for display and interaction including text, slider, Gantt chart and bar chart controls.

An additional technical advantage of the present invention is the power of a graphical user interface (GUI) specification in the report specification where commands on controls equate to GUI event handlers, controls in layouts equate to GUI widgets, layouts in reports equate to GUI window segments, menus and dialogue boxes, and a report equates to a GUI window.

BRIEF DEFINITION OF THE DRAWINGS

A more complete understanding of the present invention and advantages thereof may be acquired by reference to the following definition taken in conjunction with the accompanying drawings in which like reference numbers indicate like features and wherein:

FIG. 1 is a block diagram of a report generation system, constructed according to the teachings of the present invention;

FIG. 2 illustrates a table showing expressions utilizing a list and the number of cells resulting from evaluation of the expressions;

Figures 4A, 4B, 4C, 4D:
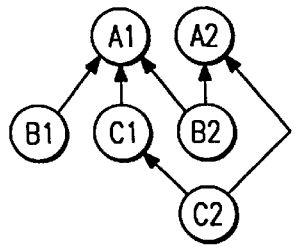

FIGS. 3A, 3B, 3C, and 3D illustrate tables showing examples of lists and evaluations of expressions that are functions of lists;

FIG. 4A illustrates a dependency diagram; and

FIGS. 4B, 4C, 4D, 4E, 4F, and 4G illustrate tables showing examples of axis-cross layouts of cells resulting from evaluation of expressions.

DETAILED DEFINITION OF THE INVENTION

Report Generation System

FIG. 1 is a block diagram of a report generation system, indicated generally at 10, constructed according to the teachings of the present invention. Report generation system 10 includes a compiler 12. Compiler 12 receives a report definition 14 and model interface functions 16. Report definition 14 refers by name to at least one layout definition 18. Layout definition 18 refers by name to a worksheet definition 20 and at least one control definition 22. Worksheet definition 20 includes at least one cell definition 24 that includes at least one expression 26. There should be at least one control definition 22 associated with any cell definition 24 that is to be visible to the user. One control definition can be associated with zero or more cell definitions, and one cell definition can be associated with zero or more control definitions. The embodiment of FIG. 1 is not intended nor should be construed to limit the scope of the present invention. More than one report definition 14 can use the same layout definition 18, and more than one layout definition 18 can use the same worksheet definition 20.

Compiler 12 generates a report template 28 from a report definition 14 and model interface functions 16. Report template 28 includes a layout template 30 for each layout definition 18 in report definition 14. Layout template 30 includes a worksheet template 32 corresponding to worksheet definition 20. Layout template 30 also includes a control template 34 for each control definition 22 in report definition 14. Worksheet template 32 includes a cell template 36 for each cell definition 24 in report definition 14. Cell template 36 includes an expression 38 for each expression 26 in cell definition 24.

An evaluator 40 receives report template 28 and model interface functions 16. Evaluator 40 also accesses a user model 42. User model 42 comprises a model of a user environment such as a manufacturing environment. Evaluator 40 generates a report instance 44. Report instance 44 includes a layout instance 46 corresponding to layout template 30. Layout instance 46 includes a worksheet instance 48 and control instance 50 corresponding to worksheet template 32 and control template 34. Worksheet instance 48 includes at least one cell instance 52 corresponding to an evaluation of cell template 36. Cell instance 52 includes a value 54. A renderer 56 is coupled to report instance 44. Renderer 56 generates a report 58 and manages interaction with report 58.

In one embodiment of the present invention, report generation system 10 comprises a computer software system executed by a general purpose digital computer. In this embodiment, a data storage device 60 is operable to hold model interface functions 16 and user model 42. A data storage device 62 is operable to hold report definition 14, report template 28 and report instance 44. Data storage devices 60 and 62 can comprise magnetic storage devices, memory devices or other such data storage devices. Further, data storage devices 60 and 62 can be separate or can comprise parts of a single device. An execution memory 64 is operable to hold compiler 12, evaluator 40 and renderer 56 such that each can be executed by a processor in the general purpose digital computer. Execution memory 64 is also operable to hold executable code associated with model interface functions 16. Execution memory 64 can comprise a memory device or other such data storage device. A display device 66 is operable to display report 48 for viewing and interaction by a user of report generation system 10. A printer is an example of a display device 66 that can display the report but can not support interaction with the report.

Report Generation Model

In operation, compiler 12 generates report template 28 from report definition 14 utilizing model interface functions 16. Report template 28 is provided to evaluator 40. Evaluator 40 generates report instance 44 from report template 28 utilizing model interface functions 16 and data from user model 42. Report instance 44 is provided to renderer 56. Renderer 56 generates report 58 from report instance 44 and manages use interaction with report 58. In this report generation mode, report generation system 10 processes report definition 14 to produce report 58 which displays and allows interaction with the desired report information incorporating data from user model 42.

Report generation system 10 is user-programmable, model-independent, and interactive. Model independence arises from the fact that report definition 14 generically defines the desired report without regard for the data values contained in user model 42. Report definition 14 includes a layout definition 18 for each window segment desired in report 58. Layout definition 18 includes worksheet definition 20 and a control definition 22 for each independently defined window element desired in the window segment in report 58. Each window element for control is associated with, displays and provides interaction with, particular cells defined by worksheet definition 20. Worksheet definition 20 defines at least one cell definition 24 having at least one expression 26.

Compiler 12 receives a report definition 14 as an input. Compiler 12 generates a corresponding report template 28 suitable for use by evaluator 40. Compilation of some of the functions used in expressions 26 are as dictated by model interface functions 16. The resulting expressions 38 refer to the corresponding executable function in the model interface functions 16 for use by evaluator 40.

Evaluator 40 receives report template 28 as an input. Evaluator 40 accesses model interface functions 16 to obtain function implementations in order to evaluate each expression 38 in report template 28. Evaluator 40 accesses data in user model 42 according to the function implementation when evaluating each expression 38. Evaluator 40 generates report instance 44 in which each cell template 36 has been evaluated to one or more cell instance 52 each having a value 54. Value 54 is the result of evaluating expression 38 with data from user model 42. Evaluator 40 also converts each control template 34 to a control instance 50 appropriate for use by renderer 56 to display interactive controls reflecting cell values 54.

Renderer 56 receives report instance 44 as an input. Renderer 56 processes each control instance 50 and worksheet instance 48 associated with each layout instance 46 to generate and display report 58. Renderer 56 may also manage interaction with the generated report 58 in the case of electronically rendered reports. Report 58 displays data from user model 16 according to the desired report analysis defined by report instance 44.

Interactive Mode

Report generation system 10 can be interactive with respect to a user after report 58 is generated and displayed. In this interactive mode, a user can interact with report 58 to modify user model 42 and to modify report instance 44. In one embodiment of the present invention, report 58 is displayed through a graphical user interface (GUI) and interaction is driven by actions a user takes on controls in the GUI display.

In interactive mode, report 58 provides information to renderer 56 describing actions taken by a user. Renderer 56 makes corresponding changes in report instance 44 such as changing value 54 for cell instance 52. Evaluator 40 receives the changes to report instance 44, accesses report template 28 if necessary, and makes appropriate changes to data values in user model 42. Evaluator 40 also re-evaluates report template 28, regenerating report instance 44, if any values of other cells should change due to a change of data values in user model 42.

Modification of user model 42 and report instance 44 is accomplished through the use of "get" and "set" expressions for expression 38 in cell template 36. The get expression informs evaluator 40 what data to obtain as a value from user model 42 when evaluating an expression 38. The set expression informs evaluator 40 as to an appropriate response to a change in value 54 interactively caused by a user modifying report 58. When value 54 for cell instance 52 is changed, evaluator 40 determines whether to modify data values within user model 42. As an example, a first cell may give a value for a queue time associated with a particular manufacturing resource. The get expression associated with the first cell could inform evaluator 40 what data to obtain for the queue time from user model 42. The set expression associated with the first cell could inform evaluator 40 that a change in the value of the first cell should result in changing the data in user model 42 to match the queue time value entered by the user. A second cell could display a sum of the queue time and a wait time associated with the same resource. A get expression associated with this second cell could inform evaluator 40 what data to get from user model 42 for the queue time and the wait time and to sum the two values. The set expression associated with the second cell could inform evaluator 40 that a change in the value of the second cell should result only in a change of the wait time in user model 42. Thus, if the queue time were 10, and the wait time were 5, and a user changed the value of the second cell from 15 to 20, evaluator 40 would change the data in user model 42 for the wait time from 5 to 10.

Report generation system 10 is programmable in that report definition 14 is created and supplied by a user such as through a graphical or textual report tool. Report definition 14 refers to one or more layout definitions 18. Each layout definition 18 refers to a worksheet definition 20 and consists of a number of control definitions 22. Multiple report definitions 14 can share layout definitions 18. Layout definition 18 can share worksheet definitions 20. Each worksheet definition 20 consists of one or more cell definitions 24 which contain expression 26. Each control definition 22 is associated with zero or more cell definitions 24 of worksheet definition 20.

Report definition 14 is compiled by compiler 12 into report template 28. Report template 28 has similar form and structure to report definition 14. Compiler 12 utilizes model interface functions 16 designed for accessing user model 42 to define function calls placed in expressions 38. Report template 28 is evaluated using implementations from model interface functions 16 and data from user model 42 by evaluator 40. Evaluator 40 evaluates report template 28 to generate report instance 44. Report instance 44 can drive a number of renderings including on-screen graphical user interfaces (GUI's) or paper reports. According to the teachings of the present invention, report instance 44 is not static. By interaction of a user with report 58, report instance 44 operates as an interactive tool giving a user the ability to manipulate data in user model 42 and change values in report instance 44.

Interaction With User Model

Report generation system 10 provides interaction with user model 42. User model 42 comprises a data structure for supporting desired report functionality such as manufacturing planning. Expressions 26 in report definition 14 support functions for accessing user visible data in user model 42. Those functions further support both getting and setting of values in user model 42, as described above. Editing a cell in report 58 can have two effects: the user can change what portion of user model 42 the cell accesses, or the user can change the value of a data field in user model 42 that is accessed to generate the cell value.

According to the teachings of the present invention, the function implementations that pull information out of user model 42 are associated with a type such that the type of data (quantity, number, string, pathname, etc., or a user model type such as an operation, resource, buffer, etc.) pulled out by each function is known and checked. For example, if a function expects to be passed a quantity, but instead is passed a pathname, then the call to that function will not compile and compiler 12 can post an error. Parameters are passed to worksheet definitions 20 which are model independent. For example, a worksheet definition 20 can be defined that will cause the display of fields related to a resource without specifying which resource. When calling or instantiating that worksheet definition, the desired resource can be passed as a parameter. Parameters of a worksheet or report define what additional information must be combined with the worksheet or report template so that it may become a worksheet or report instance.

Classes of Worksheets

Worksheet instance 48 is a collection of cells that consists of evaluated expressions. The cells are named by row-column as with a conventional spreadsheet, but are not restricted by that naming as in conventional spreadsheets. Worksheets in which cells are defined can be one of several different classes of worksheets.

One class of worksheets produces cells like a traditional spreadsheet such that for each cell in worksheet definition 20 there is one cell generated in worksheet instance 48. Cells are generated in the same row and column position as the cells are named.

According to the teachings of the present invention, other worksheet classes can be defined that are very different from the spreadsheet class. For example, a menu worksheet class may produce cells such that each cell is a menu entry with a label, mnemonic, and keyboard accelerator. Another worksheet class is a replicating worksheet which may generate hundreds of cells in the instantiation of worksheet instance 48 for each cell in worksheet definition 20. The cells are replicated depending upon information in the data set of user model 42.

Replicating Worksheet

FIG. 2 illustrates a table showing expressions utilizing lists and the number of cells resulting in evaluation of the list expressions. One data type that can be returned by a worksheet expression is a "list of elements of type V" or "type LIST <V>." A replicating worksheet can be evaluated such that one cell will be instantiated for each element in a list computed by a single cell expression. Cells that use a cell that computes a list see a type matching the type of elements that are in the list. The same number of cells generated for a list can be generated for each cell expression that computes from the list. The table of FIG. 2 provides examples of expressions utilizing lists.

A cell whose expression evaluates to List <V> can be instantiated with one cell for each V in the list. The number of cells depends on the size of the list which in turn depends upon the user model data set to which the worksheet is applied. For example, consider a cell A1 that accesses the model field "primes" returning a list of three numbers that are prime: 2, 3, and 5. A List <T> is treated the same as List <V>. Consider a cell A2 that accesses another field "vowels" returning a list of five strings containing vowels: a, e, i, o, and u.

As shown in row three of FIG. 2, a cell's expression may compute a value of type S using the cell that computes List <T>. The expression uses data of type T, and can be reevaluated for each T in List <T>. Thus, the expression can instantiate the same number of cells as elements in List <T>. The relationship between corresponding cells instantiated with T's and instantiated with S's is maintained according to the teachings of the present invention. For example, the cells can be displayed in the same row or column.

As shown in row four of FIG. 2, another cell's expression may compute a value of type R using both a T and a V from List <T> and List <V>. In this case, an R can be computed for each combination of T and V computed in List <T> and List <V>. If List <T> results in ten T's, and List <V> results in seven V's, there will be 70 R's computed. Once again, the relationship between each R and the T and V from which it was computed can be maintained. For example, if the T's are in rows and the V's are in columns, and then the R's can be placed in the row-column intersection relative to the T and V from which each R was computed.

In row five of FIG. 2, a cell computes a List <Q> from each T in List <T>. In this case, the instantiation of the cell can include one cell for each Q in each List <Q> computed from each T in List <T>. If three T's were computed, for example, the first one may yield four Q's, the next one may yield two Q's, and the last one may yield five Q's. There would be eleven Q's, and each would be instantiated into a separate cell. The relationship between the Q's and the T's from which each Q was computed can be maintained as mentioned above. This relationship results in a hierarchy, where each parent T may have several children Q's.

An expression could compute a List <P> from both a T and a V, which came from List <T> and List <V>, respectively, as shown in row six of FIG. 2. The result can be one cell for each P in each List <P> generated from each combination of T and V. For example, D1 could compute the next A1 number of letters following the letter in A2. Given A1 has value 2 and A2 has value "a", the generated list for D1 would be "b" and "c" (the 2 letters following "a"). Given A1 has value 5 and A2 has value "u", the list "v", "w", "x", "y", "z".

Finally, in FIG. 2, a cell could compute a list <N> obtained by referencing itself. Such a cell is recursive. For example, a cell A1 could return the List[Item] that includes all Items required to build a particular Item. For each Item in that list, we may want to find the List[Item] need to build that Item. By continuing in that way, the full tree of Items that go into an Item can be generated. The 'recurse' function supports such self-referencing cells. The initial list is passed into recurse along with an expression to be evaluated on each licensor, for example #.children.

Examples of Cells Based Upon Lists

FIGS. 3A 3B, 3C and 3D illustrate examples of cells instantiated based upon lists. In FIG. 3A, list A1 includes three elements: 2, 3 and 5. Cell B1 computes (A1+3). Evaluation of B1 is performed once for each element in the list of A1. Thus, the result for B1 is three cells having the values 5, 6, and 8, as shown.

FIG. 3B illustrates cells instantiated based upon two lists. Cell B2 computes A2 concatenated with a string representation of A1. A2 is a list of vowels: a, e, i, o, and u, and A1 is a list of prime numbers: 2, 3 and 5. B2 converts the prime number of A1 to a string and concatenates the vowel in A2. The expression of B2 is reevaluated for each combination of elements from A1 and A2. Thus there are fifteen cells instantiated as shown in FIG. 3B.

FIG. 3C illustrate a list generated from a list. Cell C1 computes the next A1 multiples of A1. For this expression, A1 is a number. The expression of C1 evaluated from A1 is reevaluated for each number in A1. The result is a list of numbers for each C1 evaluated from A1. As shown in FIG. 3C, ten cells are instantiated.

FIG. 3D illustrates cells based upon a second list that itself is based upon a first list. C2 has the same formula as B2, but is computed from C1 and A2 rather than B1 and A2. C2 generates one cell for each combination of A2 and C1. Thus, fifty cells are instantiated for C2 as shown in FIG. 3D. The examples of FIGS. 3A through 3D are not intended and should not be construed to limit the scope of the present invention.

Classes of Layouts

A layout specifies how cells instantiated from a worksheet should be arranged for presentation to and interaction with a user. Each worksheet can have many layouts, and each layout can present the same information in a different way. There can be different classes of layouts. An example layout for replicating worksheets is the axis-cross layout which allows the generated cells to be organized hierarchically in two different axes and in the intersection, or the "cross". This allows cells computed from multiple other cells to be arranged meaningfully, showing the relationships between the cells. Alternatively, the same replicating worksheet could be presented with a bar chart layout presenting the information as bars in a histogram. The information could be organized into side by side bars, stacked bars, and nested bars.

Axis-Cross Layout

An axis-cross layout organizes cells of a replicating worksheet into three sections: the X axis, the Y axis and the cross (the intersection of the two axes). In one embodiment of the present invention, each cell may appear in zero or one of the sections.

FIG. 4A illustrates a dependency diagram and FIGS. 4A, 4B, 4C, 4D, 4E, 4F and 4G illustrate examples of axis-cross layouts. A cell in the X or Y axis cannot appear in a different axis than any cell from which it computes. Therefore, a cell that is computed from cells in both axes can only appear in the cross. In an axis, each cell nests within other cells it is dependent upon and nests within any cells to the left of it. In the cross, the cells nest within any of the cells in the axis, but do not nest within other cells in the cross. The elements of FIGS. 4A through 4G are based upon the icells and expressions used as examples in FIGS. 3A through 3D as described above.

FIG. 4A illustrates a dependency diagram. A1 and A2 are independent (not dependent on other cells). B1 and C1 depend upon A1. B2 depends upon both A1 and A2. C2 is dependent on A2 and C, and is thus indirectly dependent upon A1.

FIG. 4B illustrates a layout where the Y axis includes A1, B1 and C1. Elements in the Y axis are displayed in columns, where as elements in the X axis (empty in this example) would be displayed in rows.

FIG. 4C illustrates an axis-cross layout where the Y axis includes A1, B1, and C1. The X axis includes A2 and the cross, where the cross is defined as B2. Thus, the elements of A1, B1, and C1 are arranged in columns, and the elements of A2 are arranged in a row. The cells of B2 are located in the cross, as shown.

FIG. 4D illustrates an axis-cross layout where the Y axis includes A1, B1, and C1, and the X axis includes A2 and the cross, where the cross is defined as C2. Similar to FIG. 4C, the cells of A1, B1, and C1 are located in columns, and the cells of A2 are located in a row. The cells of C2 are located in the cross, as shown.

FIG. 4E illustrates an axis-cross layout where the cross is defined to include two lists. In FIG. 4E, the Y axis is defined to include C1. The X axis includes A2 and the cross, where the cross is defined as B2 and C2. In this layout, for the X axis, the cross nests within A2. Thus, the cells of the cross are grouped under the cells of A2. As shown, the cells of C1 are arranged in a column, and the cells of A2 are arranged in a row. The cells of the cross are arranged according to the B2 and C2 corresponding to each element of A2.

FIG. 4F is similar to FIG. 4E except the nesting of the X axis is switched. In FIG. 4F, the X axis is defined as the cross and A2, where the cross includes B2 and C2. The Y axis is again defined as C1. In FIG. 4F, A2 nests within the cross. Thus, the cells of the cross are separated according to B2 and C2, as shown.

Figure 4G:
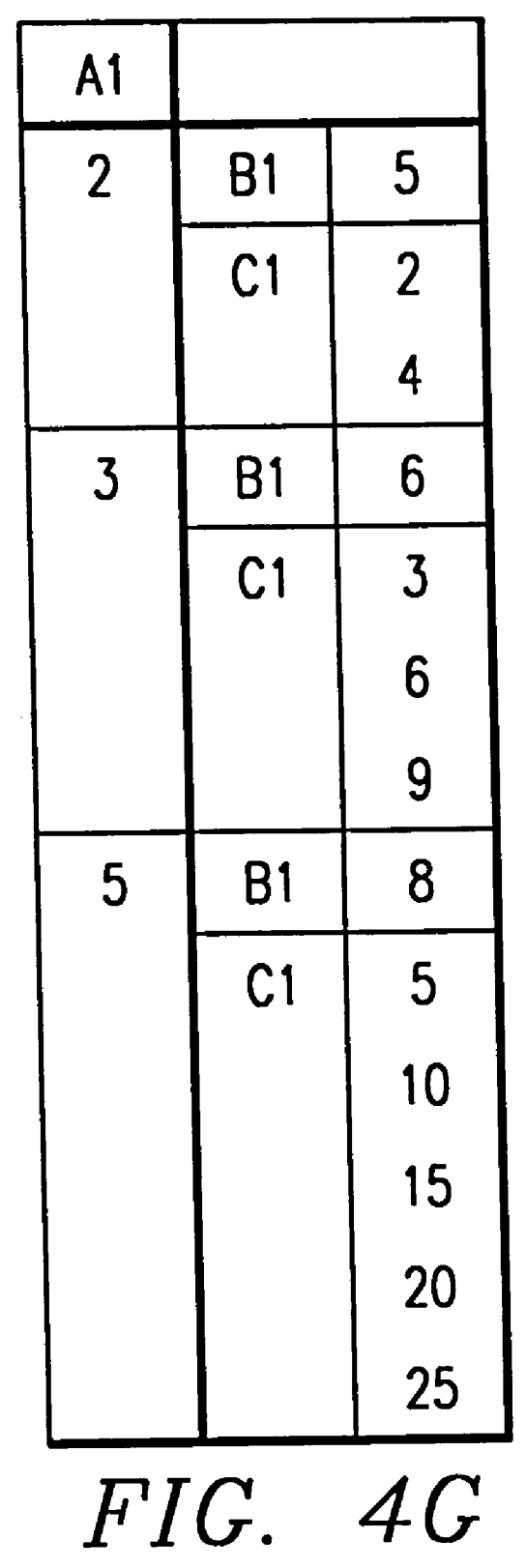

FIG. 4G illustrates an example of grouping. In FIG. 4G, the layout is defined such that B1 and C1 are grouped under A1. For each value under A1, all of the titles in the group will nest. In this case, the titles A1 and C1 nest in rows for each value of A1. In a second column, the values of the group nest with and under the corresponding group title. So, the C1 values are put on the rows with the C1 title. Dependent groups can also be defined which nest like groups, but do not display a column of titles. Rather, the values display dependent upon which independent group member is displayed on the current row. Finally, if a group member has no values, then no row needs to be generated for the value or the title.

Classes of Chart Layouts

There can be a number of different layouts such as bar charts (histograms with side-by-side, stacked and overlapping bars), pie charts, line charts and Gantt charts. Each layout allows the arrangement and display of the same cell information but in different graphical formats and with different interactive behavior.

A bar chart layout may allow a user to specify a series of cells. The first cell on an axis is the deepest, the second is in front of the first, and so on. A group of cells of that axis indicates that those cells are at the same depth, positioned side-by-side. The first cell in the group is the left most, the next is to the right of that and so on. A group within a group on an axis can indicate that those cells have the same depth and same left to right position, positioned side-by-side and stacked. The first cell in the group within the group can be on the bottom, the next is on the top of that, and so on.

This is one possible set of rules for a bar chart layout. Some embodiments provide more flexibility but are not as simple. Others can be more simple but not as functional. It is advantageous to provide several different bar chart layouts that provide different features and complexity.

For example, an axis-bar chart layout could be setup like one axis of the axis-cross layout, allowing arbitrary nesting in the axis labels, and inclusion of arbitrary information, just as if it was an axis of axis-cross. Effectively, the last one or few cells in the nesting would be specified to use the bar control, resulting in them being displayed as bars.

A multi-line line chart can be done similarly. One axis of axis-cross is given. All cells that are not given one of several line controls are displayed just like axis-cross. The cells that are specified to have line control are replaced in the axis cross with just a legend indicator (the shape of the points used for that line) and the data is drawn as a line.

Another class of layout is a Gantt chart. A cell is specified to delineate the rows. Then a dependent cell that computes a list is defined that generates the blocks and their labels for the Gantt chart. Then two cells that are dependent upon the second cell define the start and end positions of each block. The result is a generic specification of a Gantt chart. A Gantt chart could be specified in other ways, and given various features, duality, flexibility, and ease of use.

A further layout class is a menu layout. The menu layout provides a series of cells containing "buttons" or menu items. The layout can result in a platform and window system conforming menu that includes look and feel, mnemonic handling, and accelerator handling as appropriate for the platform. In fact, where the native window system provides menu mechanisms, the menu layout and controls can be compiled directly into menus of the native window system, giving efficiency and consistency Controls Controls are individual display elements of a layout. For example, a pie slice in a pie chart layout can be a separate control. Each bar in a Gantt chart layout can be a separate control, and each cell of a tabular layout could contain a different control. A slider control could be placed in a cell if the cell were numeric. The slider provides a graphic handle that slides in a groove indexed with the range of possible values for the cell. A user can change the value of the cell by sliding the handle using interaction with a mouse or other input device. A logical valued cell may have a check box control that is checked if true and empty if false. Changing the value is accomplished by clicking the mouse on the box.

Each class of layout determines the type of controls that are meaningful. Some layouts may not need different controls to be selected. However, the more controls accepted by a layout, the more flexible that layout because the more options that are available.

For example, consider the line chart layout. There are several different line controls that give different charts. The line control takes an 'x' and a 'y', draws a point at that position, and connects a straight line from the previous position to this new points position. The line-step control also takes an 'x' and a 'y' and draws a point at that position, but it connects with the previous point by drawing horizontally from the previous point to the 'x' of the new point and 'y' of the previous point, and then drawing vertically to the new point. The line-rate control takes a third value in addition to 'x' and 'y': a 'rate'. It draws the point at 'x' and 'y' like the other, but draws a line from the previous point with a slope of 'rate' until it reaches the 'x' of the new point, at which point it draws vertically.

As another example, a pie slice control would generally be useful only in a pie chart layout, and pie chart layouts may only allow pie slice controls. Some pie slice controls may allow edges to be dragged in order to change the value displayed. Other pie slice controls may allow the slice to be pulled out of the pie in order to highlight the slice. Other controls may display text in the slice. Similarly, Gantt charts may only allow Gantt bar controls. In contrast, a text control may be usable in many layouts. Some text controls may allow any text to be inserted. Other text controls may restrict what text can be input or may invoke validation rules. In addition to the behaviors provided by a control, additional commands can be attached to a control to be invoked for particular events. For example, a command "bring up help menu" could be associated with event "right button" for a particular control in a given layout.

Overview

The report generation system of the present invention can comprise a software system executable on a general purpose digital computer. In general, the report generation system operates in two modes. The first mode is that of generating a report. In this generation mode, the report generation system processes a report definition by compiling it to a report template and evaluating the report template to a report instance. The report instance is then rendered to display the report to a user. At this point, the report generating system can enter into the second mode.

This second mode is an interactive mode. A user is enabled to interact with the report display in a number of ways. The report is analogous to a traditional GUI environment. The analogies are as follows: GUI event handlers are commands and bindings on controls; GUI widgets are controls in layouts; GUI windows segments are layouts; GUI menus are layouts; GUI dialogues are layouts; and GUI windows are reports.

A report is a window displaying information to a user. A user performing an action in a report constitutes an event on a control. The controls in the layouts, once activated, are serviced. A user is enabled to perform various functions including editing the values in the report and editing associated values in the user model. The user interacts with the report based upon the graphical user interface.

One technical advantage of the present invention is allowing interactive access to a model of a user's environment through report functions where the functions are parameterized and are independent of the model. The cells provided in a worksheet of a report that have "set" expressions in addition to "get" expressions such that editing the cell can result in changes to data in the user's model as opposed to changes simply in the cell. In addition, report information types are used that are identical to information types in the user's model, supporting and allowing type sensitive expressions, functions, menus and help features.

Another technical advantage of the present invention is the provision of different classes of worksheets within reports such as a spreadsheet worksheet and replicating worksheets.

A further technical advantage of the present invention is the provision of different classes of layouts associated with each class of worksheets in reports such as tabular, bar chart, Gantt chart, pie chart and menu layouts. Further, the present invention allows different tabular layouts, and in particular provides the flexible axis-cross layout for replicating worksheets in reports.

A further technical advantage of the present invention is the capability of layouts to utilize different controls for display of and interaction with the cells in the worksheets of a report. Examples of the different controls provided include different classes of controls for display and interaction including text, slider, Gantt chart and bar chart controls.

An additional technical advantage of the present invention is the power of a graphical user interface (GUI) specification in the report specification where commands and bindings on controls equate to GUI event handlers, controls in layouts equate to GUI widgets, layouts in reports equate to GUI window segments, menus and dialogue boxes, and a report equates to a GUI window.

The report generation system of the present invention provides a powerful reporting system allowing a user to create reports, analyze data, and engage in hypothetical evaluations of a user model.

Although the present invention has been described in detail, it should be understood that various changes, substitutions and alterations can be made hereto without departing from the spirit and scope of the invention as defined by the appended claims.

What is claimed is:

1. A computer implemented model-independent report generation system comprising:
   a worksheet definition comprising model-independent expressions;
   a user model that models a user environment;
   a plurality of model interface functions associated with the user model;
   a compiler operable to receive the worksheet definition and to access the plurality of model interface functions, the compiler further operable to generate, based upon the worksheet definition and the model interface functions, a worksheet template comprising model-dependent expressions; and
   an evaluator operable to receive the worksheet template and to access the plurality of model interface functions and the user model, the evaluator further operable to evaluate the worksheet template, using the model interface functions and data from the user model, and to generate a worksheet instance containing model-specific values.

2. The system of claim 1, wherein the worksheet definition, worksheet template and worksheet instance comprise a plurality of cells.

3. A computer system for providing a user with a computer implemented model-independent report generation system, comprising:
   a data storage device operable to store data representing a user model data set that models a user environment and a plurality of model interface functions associated with the user model data set;
   a data memory operable to store data representing a worksheet definition, the worksheet definition comprising model-independent expressions, and data representing a worksheet template, the worksheet template comprising model-dependent expressions;
   an execution memory operable to store data representing a computer software application;
   a display operable to display a report to a user of the computer system; and
   a processor coupled to the data storage device, the data memory, the execution memory and the display, the processor executing the computer software application, wherein the computer software application comprises;
   a compiler operable to receive the worksheet definition and to access the plurality of model interface functions, and the compiler further operable to generate the worksheet template; and
   an evaluator operable to receive the worksheet template and to access the plurality of model interface functions and the user model data set, the evaluator further operable:
      to evaluate the model-dependent expressions in the worksheet template, using the model interface functions and the user model data set, and
      to generate a worksheet instance containing model-specific values.

4. The computer system of claim 3, wherein the worksheet definition, worksheet template and worksheet instance comprise a plurality of cells.

5. A method of operating a computer system to allow model-independent report generation for a user of the computer system, comprising;
   providing a plurality of model interface functions associated with a user model;
   providing the user model defining a data set describing a user environment;
   providing a worksheet definition comprising model-independent expressions;
   receiving the worksheet definition and accessing the plurality of model interface functions;
   generating, based upon the worksheet definition and the model interface functions, a worksheet template comprising model-dependent expressions;
   receiving the worksheet template and accessing the plurality of model interface functions and the user model data set;
   evaluating the worksheet template, using the model interface functions and the user model data set; and
   generating a worksheet instance containing model-specific values; and
   displaying a report to a user based upon the worksheet instance.

6. The method of claim 5, wherein the worksheet definition, worksheet template and worksheet instance comprise a plurality of cells.

* * * * *

UNITED STATES PATENT AND TRADEMARK OFFICE
CERTIFICATE OF CORRECTION

PATENT NO. : 5,937,155
DATED : August 10, 1999
INVENTOR(S) : Kennedy et al.

It is certified that error appears in the above-identified patent and that said Letters Patent is hereby corrected as shown below:

Title page, [54], delete "INTERACTIVE REPORT GENERATION SYSTEM AND METHOD OF OPERATION" and insert --MODEL-INDEPENDENT AND INTERACTIVE REPORT GENERATION SYSTEM AND METHOD OF OPERATION--.

Column 1, lines 1-2, delete "INTERACTIVE REPORT GENERATION SYSTEM AND METHOD OF OPERATION" and insert --MODEL-INDEPENDENT AND INTERACTIVE REPORT GENERATION SYSTEM AND METHOD OF OPERATION--.

Signed and Sealed this

First Day of February, 2000

*Attest:*

Q. TODD DICKINSON

*Attesting Officer*   *Acting Commissioner of Patents and Trademarks*